Patented Nov. 30, 1943

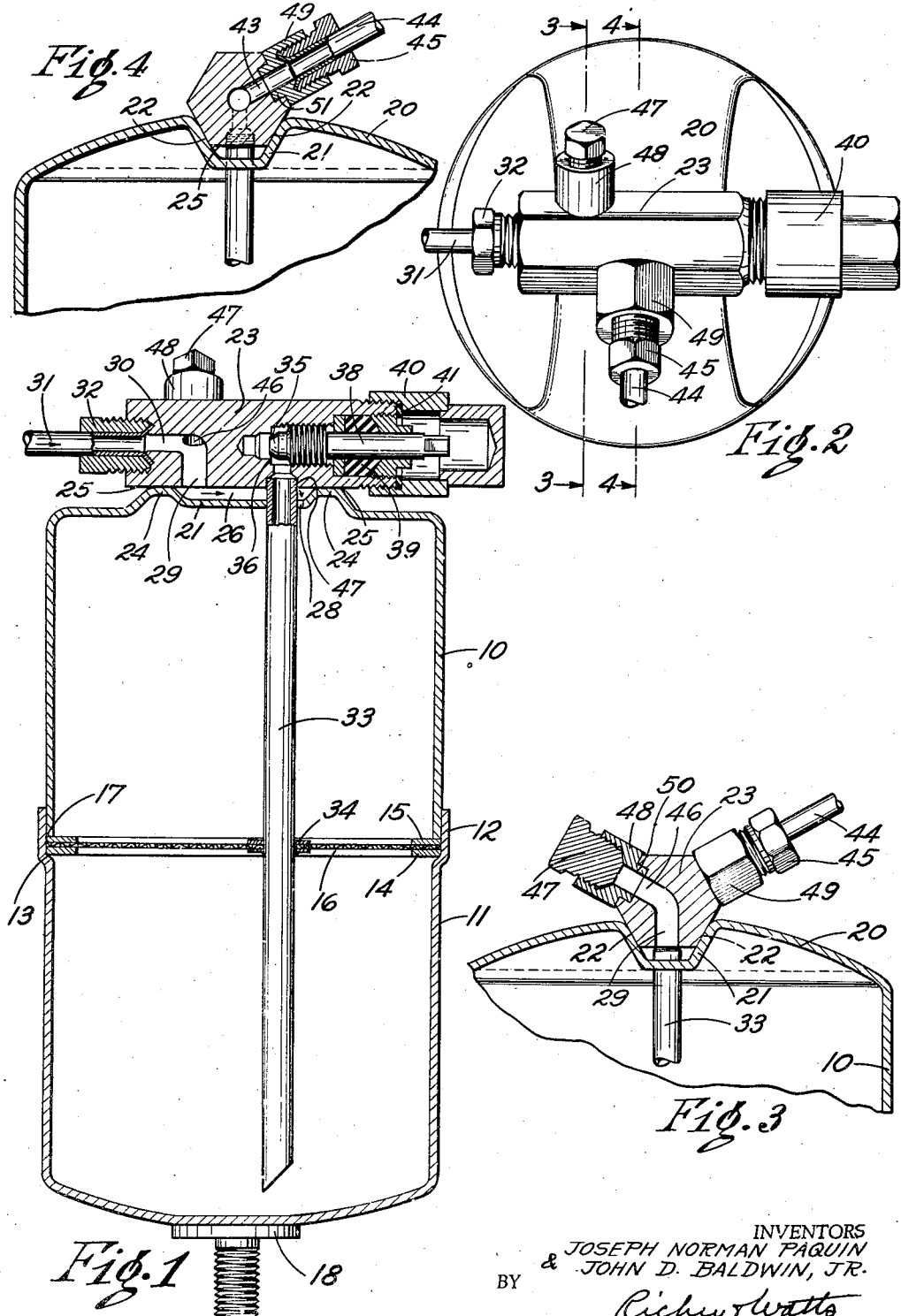

2,335,694

UNITED STATES PATENT OFFICE 2,335,694

TANK AND VALVE ASSEMBLY AND METHOD OF MAKING SAME

Joseph Norman Paquin, Euclid, Ohio, and John D. Baldwin, Jr., Los Angeles, Calif., assignors to The Weatherhead Company, Cleveland, Ohio, a corporation of Ohio Application August 3, 1940, Serial No. 350,206

8 Claims. (Cl. 29—148.2)

This invention relates to tank and valve assemblies and, more particularly, to receiver tanks and valves such as are used in mechanical refrigeration systems.

In ordinary mechanical refrigeration systems the refrigerant, after being condensed into a liquid in the condenser, flows to a receiver tank which functions as a storage reservoir and from which the liquid refrigerant is supplied to the evaporator or cooling coil as required. These tanks require connections leading to the condenser and the evaporator and are ordinarily equipped with valves adapted to shut off the flow of liquid from the receiver to the evaporator and with outlets for purging the system of air. Prior to this invention, individual connections to the tank were made for each of these fittings, and the various connections were made through the threaded joints which, of course, present the possibility of leakage.

According to the present invention the cost and weight of the tanks are greatly reduced by forming the tanks from comparatively thin-walled steel stampings while the valves and fluid connections are permanently and securely joined to the tanks by strong metal bonds, the stamped parts of the tanks and the valves and fluid connections preferably being united into a single structure by copper brazing, with preferably only a single opening through the wall of the tank.

It is, therefore, among the objects of the present invention to provide an improved and economical receiver tank valve assembly particularly adapted for use with mechanical refrigeration. Another object is to provide an economical and efficient method of making such valves. Another object is to provide such an assembly wherein threaded joints are eliminated and tank and valve are brazed into an integral assembly. A further object is to provide a receiver tank incorporating a strainer therein. A still further object is to provide a receiver tank in which the sound of the refrigerant trickling into the tank is substantially eliminated.

A preferred form of our invention whereby the above and other objects are attained is illustrated in the drawing wherein Fig. 1 is a vertical sectional view through a tank and valve assembly made according to our invention; Fig. 2 is a top plan view of the assembly shown in Fig. 1; and Figs. 3 and 4 are fragmentary sectional details as indicated by the lines 3—3 and 4—4.

As shown in the drawing, a receiver tank made according to our invention may comprise two drawn cups or stampings 10 and 11, the stamping 11 having an enlarged portion 12 adapted to receive the peripheral edge portion of the stamping 10. The enlargement 12 also provides an internal shoulder 13 so that the washers 14 and 15 supporting the screen 16 may be clamped between the shoulder 13 and the end 17 of the stamping 10. Further, the lower stamping 11 may be provided with a mounting stud 18 secured to the bottom thereof so that the receiver can be conveniently mounted in the structure of the refrigerator. Those skilled in the art will appreciate that for some sizes and shapes of tanks it will be impossible to form the tank from only two stampings. Larger tanks, for example, may require tubular body portions with drawn caps secured thereto to form the ends of the tank.

In order to provide for the flow of refrigerant into and the discharge of refrigerant from the receiver, the upper surface of the drawn cup 10 is arched upwardly as indicated at 20, the center of the arch being recessed or depressed as shown at 21. The sides 22 of the recessed portion 21 are formed to coincide with longitudinally extending surfaces of the valve body 23 which preferably is formed of a hexagonal bar of ferrous material. The depressed or recessed portion 21 terminates at either end in slightly raised portions 24 which engage the flat undersurface 25 of the valve body 23 at spaced points as shown in Fig. 1. This construction provides an enclosed fluid conducting space or passageway 26 in the completed assembly, this passageway communicating with the interior of the tank through the opening 28, and being connected to another part of the fluid system, ordinarily the condenser, through the passageways 29 and 30 drilled in the valve block 23, and the tube 31 connected to passageway 30 by any convenient coupling such as that illustrated at 32. Thus fluid from the condenser can flow through the tube 31, passages 29 and 30, the passageway 26 formed between the valve body and the depressed portion 21 of the stamping 10 and opening 28, to the interior of the receiver.

The liquid refrigerant is discharged from the receiver through a tube 33 extending from the valve body 23 downwardly through the opening 28, through the washer 34 carried by the screen 16, to a point adjacent the bottom of the receiver tank. This tube is of smaller diameter than the opening 28 so that space is left around the tube for the refrigerant from the passageway 26 to flow into the tank. By this arrangement the liquid refrigerant flowing from the passageway 26 into the tank will trickle down the exterior of the tube 33 so that it will be discharged into the liquid in the tank quietly and with practically no noise.

The flow of refrigerant out of the receiver tank is controlled by the valve member 35 which, in closed position, engages the seat 36 formed in the valve body 23. The valve member 35 is carried by a stem 38 projecting to the exterior of the valve through packing 39 and threaded within the valve body in the usual manner. The valve is normally in open position while the refrigerator is in operation and all possibility of leakage of refrigerant around the valve stem to atmosphere is prevented by the cap 40 threaded on the exterior of the valve body and provided with a gasket 41 to make a fluid-tight connection.

The refrigerant, in ordinary operation, flows past the valve member 35 and into the passageway 43 (see Fig. 4) to the tube 44 secured to the valve assembly by a coupling member 43. In ordinary installations the tube 44 leads to the evaporator or cooling coil of the refrigerator.

To provide for purging the refrigeration system of air or for supplying additional refrigerant thereto, the valve body 23 is provided with an additional opening or passageway 46 leading from the passageway 30 and closed by a plug 47 of any convenient form. If desired, this plug may be a fusible block which will release the pressure in the receiver in the event the temperature exceeds a predetermined amount.

In manufacturing the tank and valve assembly we preferably form the tank parts from ferrous sheet material into the shapes shown and described, form the valve body from ferrous bar stock to conform to the top of the tank, and join the parts together by a copper brazing operation to provide a strong and leakproof assembly. This operation is carried out, as known to those skilled in the art, by assembling the parts to be joined, supplying copper to the mating surfaces of the parts and then passing the assembly through a furnace having a controlled reducing atmosphere in which the temperature of the assembly is raised to about 2200° F. Under these conditions and with the proper atmosphere, the copper fuses and alloys with the underlying ferrous material. The copper flows between the contiguous surfaces to form extremely strong and reliable leakproof joints.

In conjunction with the present assembly the brazing operation is carried out by assembling the halves 10 and 11 of the receiver tank together with the screen and washer assembly 14, 15 and 16, in place. The tube 33 is threaded into the opening 47 in the valve body, light threads being employed merely to hold the tube in position until the brazing operation is completed. The valve body 23 with the tube assembled therewith is placed in the position shown in the drawing with the sides thereof in engagement with the sides 22 of the depressed portion 21 and the flat under-surface thereof in engagement with the raised portions 24. The fittings or threaded bosses 48 and 49 are placed in the positions shown in the drawing and may be held in position as by engagement of the projections 50 and 51 within counterbores formed in the valve body. The mounting stud 18 may be retained in position on the bottom of the member 11 as by tacking or spot welding.

The necessary copper may be supplied to the adjacent surfaces of the parts by applying small pieces of copper wire or pellets of copper thereto or by copper plating the parts before assembly or by other methods known to those skilled in the art. The assembly, consisting of the tank parts 10 and 11, the screen and washer assembly, the tube 33, the valve body 23 and fluid conducting bosses 48 and 49, is then placed in the brazing furnace and in a single operation all of these parts are securely and permanently joined together with the formation of fluid-tight joints, with the connection in between the tank and valve within the area bounded by the fluid-tight bond between these parts. Thereafter the valve stem and packing may be assembled with the valve body and the further fluid fittings such as the fitting 31 and the block 47 may be applied thereto.

Receiver tank assemblies made according to our invention are advantageous in that they are light and strong and in that the usual threaded connections between the fluid conduits and the tank are eliminated. The assemblies are compact and can be economically manufactured and readily installed in mechanical refrigerators. The copper brazing operation produces strong and leakproof joints and by the formation of a passageway between the valve body and the tank a fluid connection is eliminated and the flow of fluid into the tank is made substantially noiseless.

Those skilled in the art will understand that various changes and modifications can be made in our invention without departing from the spirit and scope thereof and that our invention can be adapted to other types of tank and valve assemblies. Therefore, it is to be understood that our patent is not limited to the preferred form of our invention specifically described herein or in any manner other than by the scope of the appended claims when given the range of equivalents to which our patent may be entitled.

We claim:

1. A tank and valve assembly comprising a tank made up of ferrous parts copper brazed together, and a valve having a body formed of hexagonal steel bar stock, the exterior of the body being copper brazed to the exterior of said tank, there being an opening in the wall of said tank within the area bounded by the copper brazed connection therebetween, the wall of said tank being spaced from said valve body adjacent said opening and within said area, and the space within said area and between the wall of said tank and said valve body constituting a fluid passageway between the exterior of said valve and the exterior of said tank in communication with said opening.

2. A tank and valve assembly comprising a tank made up of ferrous parts copper brazed together, and a valve having a hexagonal steel body, the exterior of the body being copper brazed to the exterior of said tank, there being an opening in the wall of said tank within the area bounded by the copper brazed connection therebetween, the wall of said tank being spaced from said valve body adjacent said opening and within said area, the space within said area and between the wall of said tank and said valve body constituting a fluid passageway disposed between the exterior of said valve and the exterior of said tank in communication with said opening, said valve body having a passageway in communication with said first named passageway, and a fluid conduit connected to said valve body and extending through said opening into the interior of said tank.

3. A tank and valve assembly comprising a tank made up of ferrous parts copper brazed together, and a valve having a hexagonal steel body, a longitudinally extending surface of the exterior of the body being copper brazed to the exterior of said tank, there being an opening in the wall of said tank within the area bounded by the copper brazed connection therebetween, the wall of said tank being spaced from said valve body adjacent said opening, the space between the wall of said tank and said valve body constituting a fluid passageway disposed between the exterior of said valve and the exterior of said tank in communication with said opening and surrounded by said copper brazed connection, said valve body having an inlet passageway in communication with said first passageway, a valve controlled outlet passageway, and a fluid conduit connected to said outlet passageway extending through said opening into the interior of said tank for conducting fluid therefrom.

4. A tank and valve assembly comprising a steel tank and a valve having a steel body, the exterior of the body being permanently joined to the exterior of said tank by a fluid-tight metallic bond, there being an opening in the wall of said tank within the area bounded by the bonded connection therebetween, a fluid passageway disposed between the exterior of said valve and the exterior of said tank in communication with said opening and surrounded by said bonded connection, said valve body having an inlet passageway in communication with said first passageway, a valve controlled outlet passageway and a fluid conduit connected to said outlet passageway and extending through said opening into the interior of said tank, the exterior of said conduit being smaller than said opening, whereby fluid may enter said tank through said inlet passageway and said opening, and may be removed therefrom through said conduit and said outlet passageway.

5. A method of making tank and valve assemblies including the steps of forming a valve body, forming a tank having a wall provided with surfaces adapted to conform to exterior longitudinally extending surfaces of said valve body and to provide an enclosed passageway between the exterior of said valve body and the exterior of said wall, and copper brazing said valve body to said tank to form fluid-tight connections between contiguous surfaces thereof.

6. A method of making tank and valve assemblies including the steps of forming a valve body from hexagonal ferrous bar stock, forming a plurality of tank parts from ferrous sheet stock, providing one of said parts with a raised exterior surface having a depressed portion therein, said depressed portion having surfaces conforming to exterior longitudinally extending surfaces of said valve body to form an enclosed passageway between said tank part and the exterior of said valve body within the area bounded by said conforming surfaces, assembling said tank parts and said valve body together, supplying copper to contacting surfaces of said parts and heating said assembly in a furnace to copper braze said tank parts together and said valve body thereto, to provide a fluid-tight tank and a fluid-tight connection between said valve body and said tank.

7. A tank and valve assembly comprising a steel tank and a valve having a steel body, the exterior of the body being permanently joined to the exterior of the tank by a fluid-tight metallic bond, there being an opening in the wall of said tank within the area bounded by the bonded connection therebetween, a fluid passageway disposed between the exterior of said valve and the exterior of said tank in communication with said opening and within said area, said valve body having a passageway in communication with said fluid passageway, and a fluid conduit connected to said valve body and extending through said opening into the interior of said tank.

8. A receiver tank assembly for mechanical refrigeration systems comprising a tank adapted to contain refrigerant under pressure and a valve body having a passageway therein adapted to conduct liquid refrigerant from the condenser of the refrigeration system to the tank and also having a valve controlled passageway adapted to conduct liquid refrigerant from the interior of said tank to a fluid conduit leading to the evaporator of the refrigeration system, said valve body being disposed with its longitudinally extending surfaces in engagement with the exterior of the tank, the exterior of the tank having an upwardly arched surface, the center of the arch being recessed, the sides of the recessed portion being formed to coincide with adjacent surfaces of the valve body and terminating in slightly raised portions coinciding with adjacent surfaces of the valve body, the adjacent surfaces of the valve body and tank being bonded together by a fluid-tight metallic bond, an enclosed passageway between the exterior of the tank and the exterior of the valve body within the area bounded by said metallic bond, said passageway in the valve body communicating with said enclosed passageway, there being an opening through the wall of the tank communicating with said enclosed passageway, a tube extending from the said valve controlled passageway of said valve body through said opening into said tank to a point below the normal liquid level therein, said tube being of a smaller diameter than said opening, and a space on the exterior of the tube and within said opening through which fluid can flow from said enclosed passageway to the tank.

JOSEPH NORMAN PAQUIN.
JOHN D. BALDWIN, JR.